(12) United States Patent
Bengtsson et al.

(10) Patent No.: US 11,834,311 B2
(45) Date of Patent: Dec. 5, 2023

(54) CONVEYING DEVICE AND BATTERY SWAP STATION

(71) Applicant: NIO (ANHUI) HOLDING CO., LTD., Hefei (CN)

(72) Inventors: Jan Bengtsson, Shanghai (CN); Nan Li, Shanghai (CN); Xiaotao Tian, Shanghai (CN); Xikun Ding, Shanghai (CN); Jun Liu, Shanghai (CN); Yongyue Ma, Shanghai (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 1151 days.

(21) Appl. No.: 16/508,564

(22) Filed: Jul. 11, 2019

(65) Prior Publication Data

US 2020/0017342 A1 Jan. 16, 2020

(30) Foreign Application Priority Data

Jul. 11, 2018 (CN) .......................... 201810756115.1
Jul. 24, 2018 (CN) .......................... 201810818614.9

(51) Int. Cl.
*B66F 7/06* (2006.01)
*B66F 7/28* (2006.01)
*B60L 53/80* (2019.01)

(52) U.S. Cl.
CPC .............. *B66F 7/0608* (2013.01); *B66F 7/28* (2013.01); *B60L 53/80* (2019.02); *B66F 2700/12* (2013.01)

(58) Field of Classification Search
CPC .......... B66F 7/0658; B66F 7/28; B66F 7/065; B66F 7/0633; B66F 7/0608; B66F 2700/12
See application file for complete search history.

(56) References Cited

U.S. PATENT DOCUMENTS

| 3,623,707 | A | * | 11/1971 | Klopp | ................... | B66F 7/0608 |
| | | | | | | 187/269 |
| 3,837,435 | A | * | 9/1974 | Pelouch | ..................... | B66F 7/28 |
| | | | | | | 187/219 |
| 4,750,712 | A | * | 6/1988 | Genovese | ................. | B66F 7/26 |
| | | | | | | 254/122 |
| 9,266,704 | B1 | * | 2/2016 | Hall | .......................... | B66F 3/22 |
| 2005/0045691 | A1 | * | 3/2005 | Blankenship | ...... | B23K 37/0461 |
| | | | | | | 228/49.1 |

* cited by examiner

*Primary Examiner* — Seahee Hong
(74) *Attorney, Agent, or Firm* — Sheridan Ross P.C.

(57) ABSTRACT

The invention provides a conveying device. The conveying device comprises: a bottom platform, the bottom platform comprising a horizontal guide rail; a hoisting device, the hoisting device being arranged on the bottom platform and capable of moving along the horizontal guide rail of the bottom platform, the hoisting device comprising a base, a hoisting beam and a hoisting mechanism between the base and the hoisting beam, and the hoisting mechanism enabling the hoisting beam to ascend or descend relative to the base, wherein both the base and the hoisting beam extend in a direction parallel to the horizontal guide rail of the bottom platform; and a driving device, the driving device being capable of driving the hoisting device to move along the horizontal guide rail.

4 Claims, 6 Drawing Sheets

CONVEYING DEVICE AND BATTERY SWAP STATION

CROSS-REFERENCE TO RELATED APPLICATIONS

This application claims the benefit of China Application No. 201810756115.1 filed Jul. 11, 2018, and China Application No. 201810818614.9 filed Jul. 24, 2018, the entire disclosures of each are incorporated herein by reference in their entirety.

TECHNICAL FIELD

The invention relates to the field of conveying devices. In particular, the invention relates to a conveying device especially suitable for conveying automobiles, and a battery swap station comprising the conveying device.

BACKGROUND ART

For automobiles, it is necessary to park a vehicle on a platform to operate the vehicle, for example, an electric vehicle needs to be driven into a battery swap platform to replace a battery. In general, because of a compact position of the battery swap platform, it requires a high parking accuracy of the vehicle. For a novice driver, it is difficult to smoothly drive into the battery swap platform, and careless driving may damage facilities on the battery swap platform and cause unnecessary losses. In a further aspect, when the vehicle is parked on the battery swap platform, it is also necessary to hoist the vehicle to operate the bottom of the vehicle.

SUMMARY OF THE INVENTION

An object of the invention is to solve or at least alleviate the problems existing in the prior art.

According to some aspects, an object of the invention is to provide a conveying device capable of accurately conveying a vehicle to a platform.

According to some aspects, an object of the invention is to provide a conveying device occupying small space.

According to some aspects, an object of the invention is to provide a conveying device integrated with a conveying function and a hoisting function.

Provided is a conveying device, comprising:

a bottom platform, the bottom platform comprising a horizontal guide rail;

a hoisting device, the hoisting device being arranged on the bottom platform and capable of moving along the horizontal guide rail of the bottom platform, the hoisting device comprising a base, a hoisting beam and a hoisting mechanism between the base and the hoisting beam, and the hoisting mechanism enabling the hoisting beam to ascend or descend relative to the base, wherein both the base and the hoisting beam extend in a direction parallel to the horizontal guide rail of the bottom platform; and a driving device, the driving device being capable of driving the hoisting device to move along the horizontal guide rail.

Optionally, in the conveying device, the hoisting mechanism comprises:

a first strut group and a second strut group, the first strut group and the second strut group respectively comprising a first strut and a second strut, a first end of the first strut and a first end of the second strut being pivotally connected at a pivot point, and a second end of the first strut and a second end of the second strut being respectively pivotally connected to the hoisting beam and the base; and an actuating device, the actuating device synchronously acting on the pivot points of the first strut group and the second strut group to change the angle between the first strut and the second strut of the first strut group and the second strut group so that the hoisting beam is lifted or lowered.

Optionally, in the conveying device, the first strut group and the second strut group are connected to two ends of the hoisting beam, and the actuating device is located between the first strut group and the second strut group.

Optionally, in the conveying device, the first strut and second strut of the first strut group and the first strut and second strut of the second strut group each form an outward arrow or an inward arrow.

Optionally, in the conveying device, the actuating device comprises a first actuator for a first strut group and a second actuator for a second strut group, and the first actuator and the second actuator synchronously operate and act on the pivot points of the first strut group and the second strut group.

Optionally, in the conveying device, the first actuator and/or the second actuator comprise(s):

a lead screw driven by an electric motor arranged in the base;

a screw nut matching the lead screw, the screw nut being driven by the lead screw to move horizontally; and a push rod, a first end of the push rod being pivotally connected to the screw nut, and a second end of the push rod being pivotally connected to the pivot point of the first strut group or the second strut group.

Optionally, in the conveying device, the first actuator and/or the second actuator comprise(s) a telescopic actuator, a first end of the telescopic actuator is pivotally connected to the base, a second end of the telescopic actuator is pivotally connected to the pivot point of the first strut group or the second strut group, the telescopic actuator comprises an actuator body and a first rod and second rod nested to each other, and the actuator body is capable of driving the first rod to extend or retract relative to the second rod.

Optionally, in the conveying device, the hoisting mechanism further comprises an auxiliary strut group between the base and the hoisting beam, the auxiliary strut group comprises a third strut and a fourth strut, a first end of the third strut is pivotally connected to a first end of the fourth strut, and a second end of the third strut and a second end of the fourth strut are respectively pivotally connected to the hoisting beam and the base.

Optionally, in the conveying device, the width of the hoisting beam is greater than 1 meter.

Optionally, in the conveying device, the base of the hoisting device is provided with a plurality of wheels.

Optionally, in the conveying device, the base of the hoisting device is provided with a transverse extension, and the driving device acts on the transverse extension to drive the hoisting device to move along the guide rail.

Optionally, in the conveying device, the driving device comprises a drive motor, a pair of rollers mounted at a first position on two sides of the horizontal guide rail and driven by the drive motor, a pair of idle wheels mounted at a second position on the two sides of the horizontal guide rail, and a belt wound on the roller and idle wheel on the respective side; and the driving device drives the hoisting device to move along the horizontal guide rail by means of contact between the belt and the transverse extension.

Further provided is a battery swap station, comprising a pair of conveying devices arranged in parallel according to the above embodiments.

The conveying device according to the invention has a simple structure, occupies small space, has a low height in a contracted state, and is integrated with a conveying function and a hoisting function.

An object of the invention is to solve or at least alleviate the problems existing in the prior art.

According to some aspects, an object of the invention is to provide a hoisting device having a low height in a contracted state and having a high hoisting stroke.

According to some aspects, an object of the invention is to provide a hoisting device occupying small space.

According to some aspects, an object of the invention is to provide a hoisting device for reliable and stable support.

In an aspect, provided is a hoisting device, comprising:
a base;
a hoisting beam;
a first strut group and a second strut group between the base and the hoisting beam, the first strut group and the second strut group respectively comprising a first strut and a second strut, a first end of the first strut and a first end of the second strut being pivotally connected at a pivot point, and a second end of the first strut and a second end of the second strut being respectively pivotally connected to the hoisting beam and the base; and
an actuating device, the actuating device synchronously acting on the pivot points of the first strut group and the second strut group to change the angle between the first strut and the second strut of the first strut group and the second strut group so that the hoisting beam is lifted or lowered.

Optionally, in the above hoisting device, the first strut group and the second strut group are connected to two ends of the hoisting beam, and the actuating device is located between the first strut group and the second strut group.

Optionally, in the above hoisting device, the first strut and second strut of the first strut group and the first strut and second strut of the second strut group each form an outward arrow, and the actuating device inwardly acts on the pivot points of the first strut group and the second strut group so as to lift the hoisting beam.

Optionally, in the above hoisting device, the first strut and second strut of the first strut group and the first strut and second strut of the second strut group each form an inward arrow, and the actuating device outwardly acts on the pivot points of the first strut group and the second strut group so as to lift the hoisting beam.

Optionally, in the above hoisting device, the base has a U-shaped groove, and the first strut group, the second strut group and the actuating device can be accommodated in the U-shaped groove of the base.

Optionally, in the above hoisting device, the actuating device comprises a first actuator for a first strut group and a second actuator for a second strut group, and the first actuator and the second actuator synchronously operate and act on the pivot points of the first strut group and the second strut group.

Optionally, in the above hoisting device, the first actuator and/or the second actuator comprise(s):
a lead screw driven by an electric motor arranged in the base;
a screw nut matching the lead screw, the screw nut being driven by the lead screw to move horizontally; and
a push rod, a first end of the push rod being pivotally connected to the screw nut, and a second end of the push rod being pivotally connected to the pivot point of the first strut group or the second strut group.

Optionally, in the above hoisting device, the first actuator and/or the second actuator comprise(s) a telescopic actuator, a first end of the telescopic actuator is pivotally connected to the base, and a second end of the telescopic actuator is pivotally connected to the pivot point of the first strut group or the second strut group.

Optionally, in the above hoisting device, the telescopic actuator comprises an actuator body and a first rod and second rod nested to each other, and the actuator body is capable of driving the first rod to extend or retract relative to the second rod.

Optionally, in the above hoisting device, the hoisting device further comprises an auxiliary strut group between the base and the hoisting beam, the auxiliary strut group comprises a third strut and a fourth strut, a first end of the third strut is pivotally connected to a first end of the fourth strut, and a second end of each of the third strut and the fourth strut is pivotally connected to the hoisting beam and the base, respectively.

Optionally, in the above hoisting device, the width of the hoisting beam is greater than 1 meter.

In a further aspect, provided is a battery swap station, comprising the hoisting device according to the various embodiments.

The hoisting device according to the invention has a simple structure, occupies small space, has a low height in a contracted state, and has a high hoisting stroke.

BRIEF DESCRIPTION OF THE DRAWINGS

The principles of the invention will become more apparent by reading the following detailed description in conjunction with the accompanying drawings, wherein.

DETAILED DESCRIPTION OF EMBODIMENTS

It can be readily understood that according to the technical solution of the invention, an ordinary person skilled in the art may propose multiple interchangeable structures and implementations without changing the essential spirit of the invention. Therefore, the following specific implementations and the accompanying drawings are merely exemplary descriptions of the technical solution of the invention, and should not be construed as the entirety of the invention or construed as limiting the technical solution of the invention.

Directional terms, such as up, down, left, right, front, rear, front face, rear face, top, and bottom, which are or may be mentioned in this description, are defined with respect to the structures shown in the accompanying drawings, and are relative concepts, and therefore may correspondingly vary depending on different positions and different conditions in use. Therefore, these or other directional terms should not be construed as limiting terms.

Figure 1:
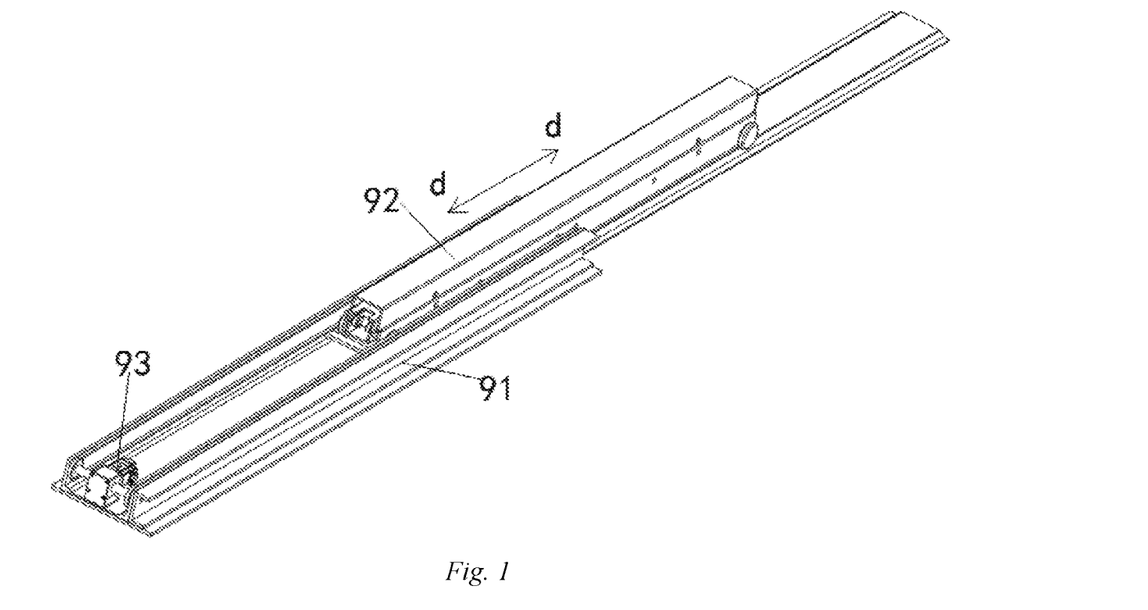
FIG. 1 shows a perspective view of a conveying device according to an embodiment, with a hoisting device folded.
Figure 2:
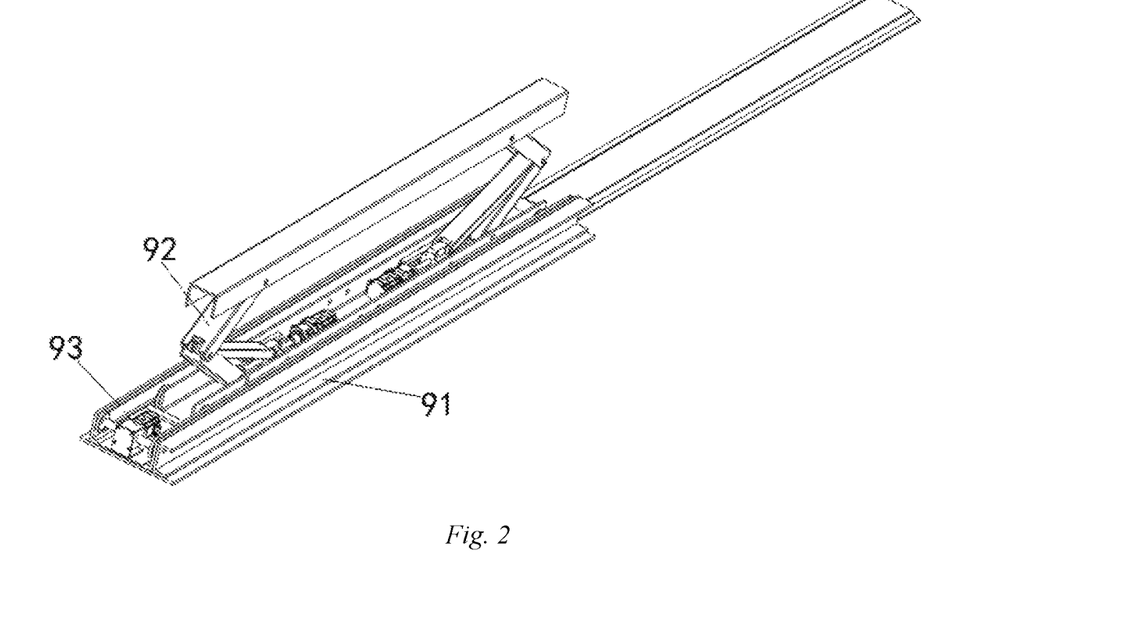
FIG. 2 shows a perspective view of the conveying device in FIG. 1, with the hoisting device unfolded.
Figure 3:
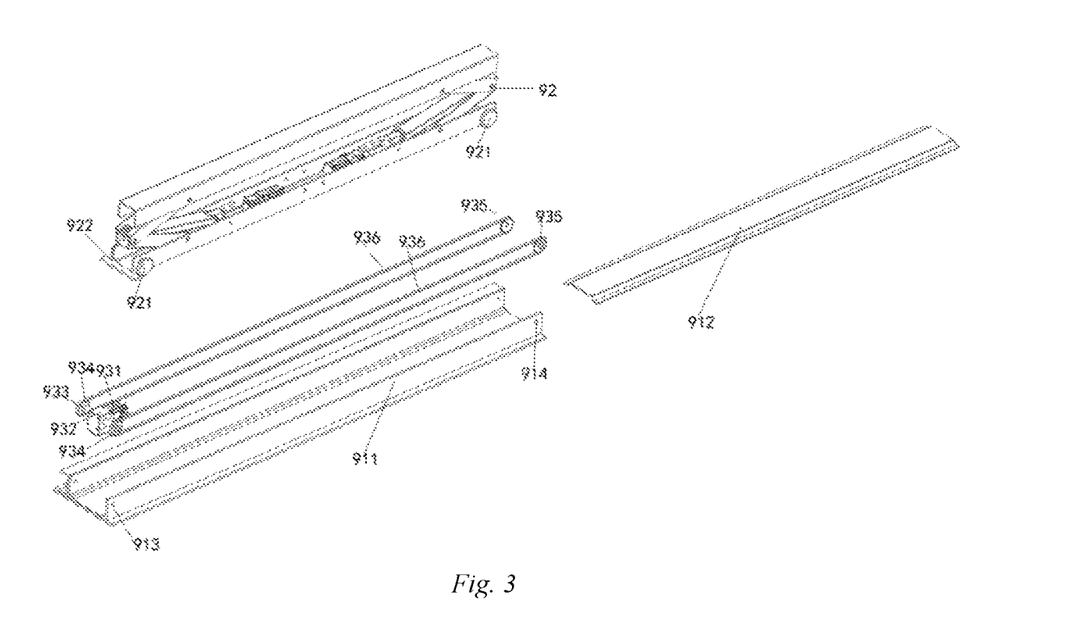
FIG. 3 shows an exploded view of the conveying device in FIG. 1.

With reference to FIG. 1 to FIG. 3, they respectively show perspective views of a conveying device in a contracted state and a hoisting state and an exploded view of same according to an embodiment of the invention. The conveying device according to the invention comprises: a bottom platform 91, the bottom platform 91 comprising a horizontal guide rail; a hoisting device 92, the hoisting device 92 being arranged on the bottom platform 91 and capable of moving along the horizontal guide rail of the bottom platform 91, and particularly moving in a direction d-d of FIG. 1; the hoisting device 92 comprising a base 1, a hoisting beam 2, and a hoisting mechanism (FIG. 4) between the base 1 and the hoisting beam 2; and the hoisting mechanism enabling the hoisting beam 2 to ascend or descend relative to the base 1, wherein both the base 1 and the hoisting beam 2 extend in a direction parallel to the horizontal guide rail of the bottom platform 91, i.e. the direction d-d; and a driving device 93, the driving device 93 being arranged in the bottom platform 91 and capable of driving the hoisting device 92 to move along the horizontal guide rail, i.e. moving in the direction d-d.

Figure 10:
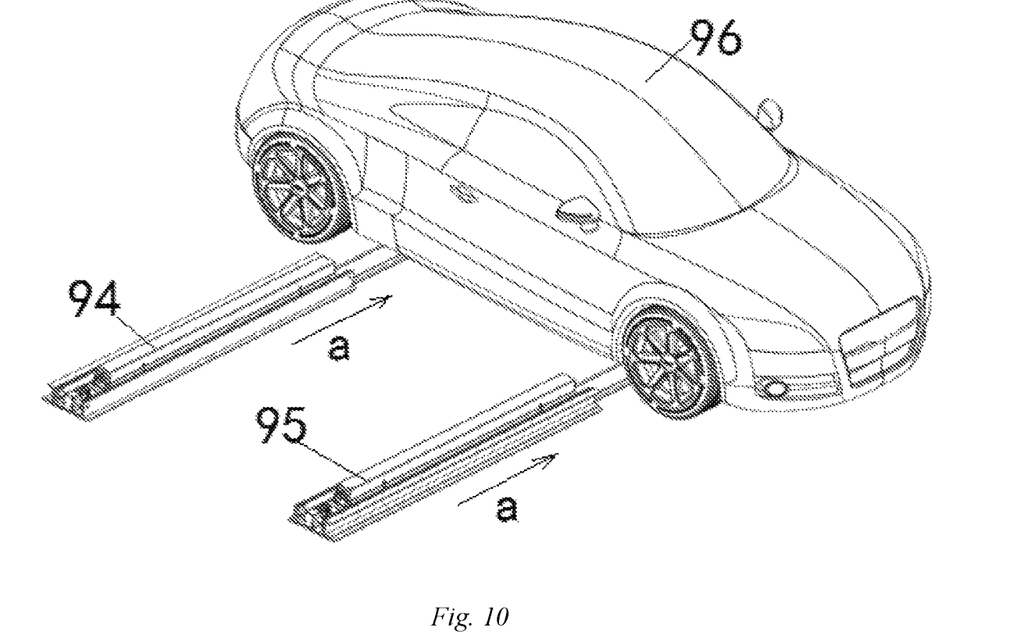
FIG. 10 to FIG. 12 respectively show a schematic view including the conveying device in conveying an automobile according to an embodiment.
Figure 11:
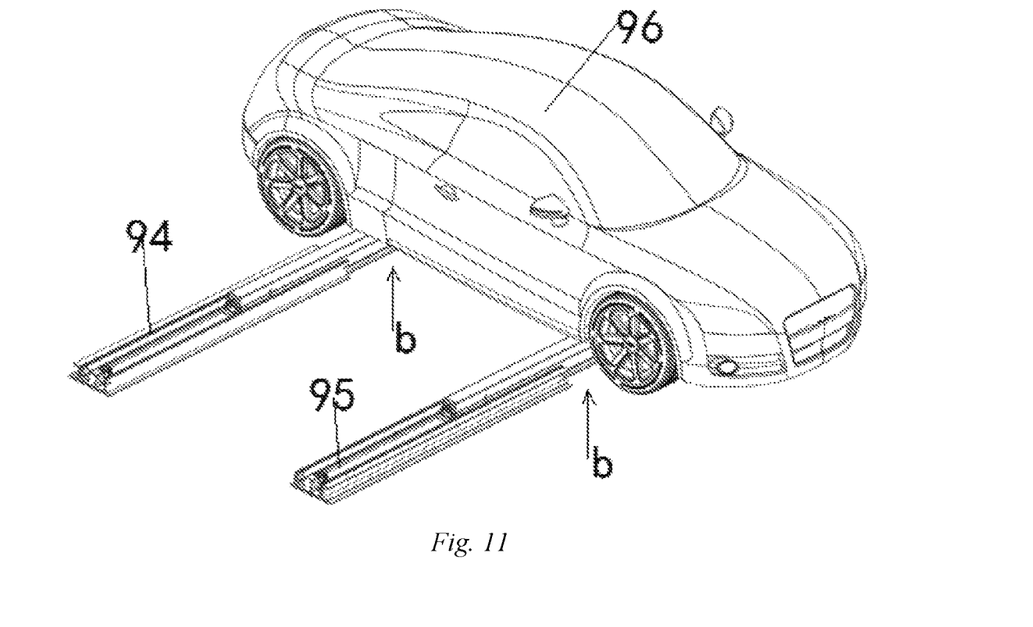
Figure 12:
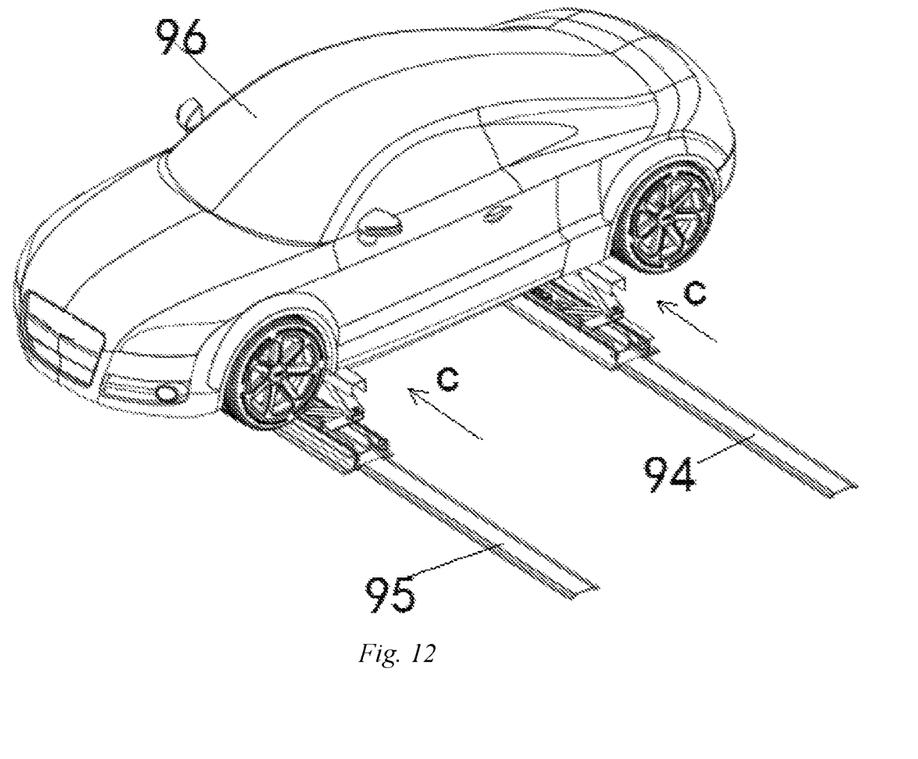

With continued reference to FIG. 10 to FIG. 12, how the conveying device operates in conveying an automobile is explained. In general, two conveying devices 94 and 95 according to an embodiment can be provided, the two conveying devices 94, 95 are arranged in parallel to and spaced apart from each other on e.g. a battery swap platform, and the spacing between them is smaller than the spacing between a front wheel and a rear wheel of the vehicle so that they can respectively act on a rear side of the front wheel and a front side of the rear wheel of a vehicle chassis to convey the vehicle. The steps for conveying the vehicle comprise: as shown in FIG. 10, the hoisting device moves in a direction a along the guide rail of the bottom platform to the bottom of the vehicle 96; as shown in FIG. 11, the hoisting device is unfolded in a direction b and hoists the vehicle 96; and as shown in FIG. 12, the unfolded hoisting device has moved in a direction c along the guide rail of the bottom platform and conveyed the vehicle 96 to and above the battery swap platform. In the state shown in FIG. 12, a battery swap operation or other necessary operations can be performed on the vehicle 96, and the hoisting device can also descend such that the vehicle 96 can be parked on the battery swap platform. Therefore, the conveying device according to the invention has the function of both conveying the vehicle and hoisting the vehicle. It should be understood that the conveying device is not limited to conveying the vehicle and can also be applied to conveying goods. In addition, the conveying device is not limited to conveying the vehicle at a battery swap station and can also be applied to a vehicle maintenance platform, a vehicle cleaning platform or other scenes where vehicles need to be conveyed.

With continued reference to FIG. 3, various parts of the conveying device according to the invention are described in detail. In some embodiments, the bottom platform 91 can comprise a platform body 911 and an extension 912, the platform body 911 can comprise a first end 913 and a second end 914, and the length of the platform body 911 can be equal to the hoisting device 92 or slightly greater than the hoisting device 92, so that the hoisting device can be accommodated in the platform body 911. In some embodiments, the platform body 911 can be mounted in the battery swap platform, and when the hoisting device moves to a position corresponding to the platform body 911, the vehicle on the hoisting device is also directly above the battery swap platform. In some embodiments, the extension 912 is mainly composed of a guide rail, and the length thereof can be adjusted according to a conveying distance required in an actual application environment.

In some embodiments, the base of the hoisting device 92 is provided with a plurality of wheels 921, and the plurality of wheels 921 is more convenient for the movement of the hoisting device 92 along the horizontal guide rail. In the embodiments shown in the drawings, the hoisting device comprises two wheels 921 on each side, and in an alternative embodiment, the base of the hoisting device 92 can be provided with more wheels 921.

In some embodiments, the base of the hoisting device 92 is provided with a transverse extension 922, the transverse extension 922 extends in a direction perpendicular to the horizontal guide rail, and the driving device 93 acts on the transverse extension 922 to drive the hoisting device 92 to move along the guide rail. In the embodiments shown in the drawings, the hoisting device 92 comprises only one transverse extension 922, and in an alternative embodiment, the hoisting device 92 can also comprise a plurality of transverse extensions 922.

In some embodiments, the driving device 93 can be directly mounted on the hoisting device 92, for example, the driving device 93 can directly drive the wheels 921 on the hoisting device 92 so as to move the hoisting device 92. In further embodiments, the driving device 93 can be arranged in the bottom platform 91, for example, the driving device 93 comprises a drive motor 931, and the drive motor 931 can be mounted at an end portion of the horizontal guide rail of the base, e.g. at a first end 913 corresponding to the platform body 911 of the bottom platform 91. A pair of rollers 934 are mounted at a first position on two sides of the horizontal guide rail, and the drive motor 931 drives the pair of rollers 934 via a gear box 932 and a shaft 933. In addition, a pair of idle wheels 935 are provided at a second position on the two sides of the horizontal guide rail, a belt 936 is wound on the roller 934 and the idle wheel 935 on the same side, the belt 936 is in contact with, e.g. fixedly connected to, the transverse extension 922 of the base of the hoisting device 92, and by means of the structure, the drive motor 931 rotates and can drive the belt 936 to rotate, so as to drive the transverse extension 922 and drive the entire hoisting device 92 to move along the horizontal guide rail, e.g. advancing or retreating in the direction d-d. In an alternative embodiment, the driving device can use any other suitable structure.

Figure 4:
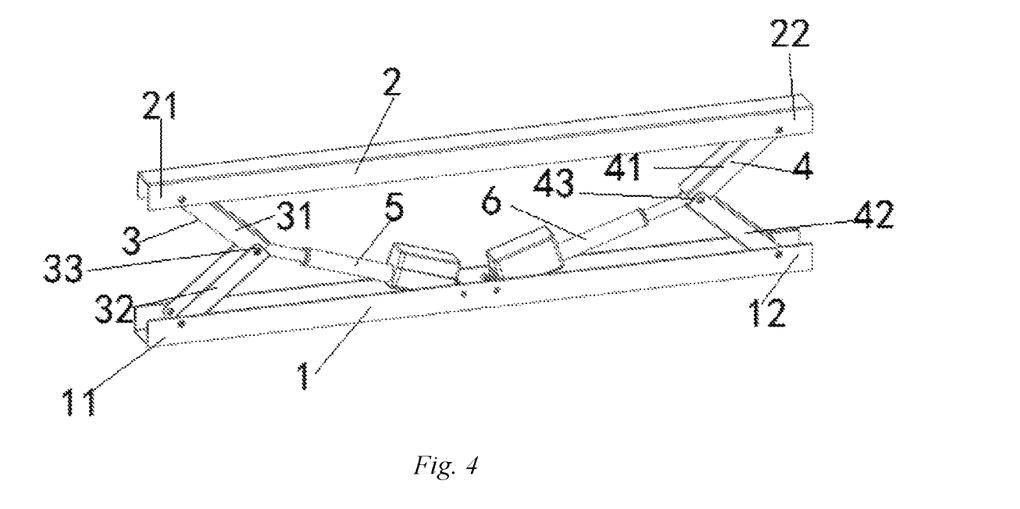
FIG. 4 and FIG. 5 respectively show a perspective view of the hoisting device of the conveying device according to an embodiment.
Figure 5:
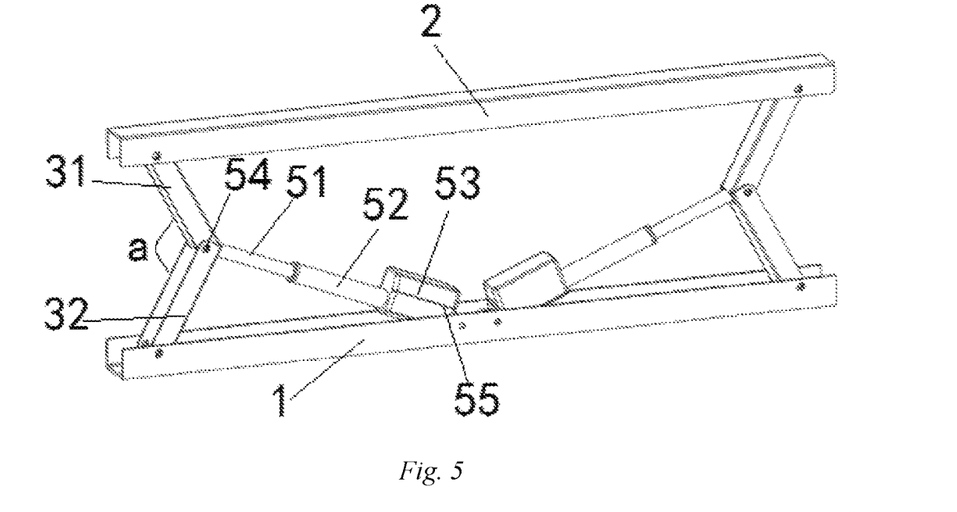

With continued reference to FIG. 4 and FIG. 5, they respectively show a perspective view of a hoisting device according to an embodiment of the invention. The hoisting device according to the embodiment comprises: a base 1; a hoisting beam 2; and a hoisting mechanism between the base 1 and the hoisting beam 2. In some embodiments, the hoisting mechanism can comprises a first strut group 3 and a second strut group 4, the first strut group 3 comprises a first strut 31 and a second strut 32, a first end of the first strut 31 and a first end of the second strut 32 of the first strut group 3 are pivotally connected at a pivot point 33, and a second end of the first strut 31 and a second end of the second strut 32 are pivotally connected to the hoisting beam 2 and the base 1, respectively. Similarly, the second strut group 4 comprises a first strut 41 and a second strut 42, a first end of the first strut 41 and a first end of the second strut 42 of the second strut group 4 are pivotally connected at a pivot point 43, and a second end of the first strut 41 and a second end of the second strut 42 of the second strut group 4 are pivotally connected to the hoisting beam 2 and the base 1, respectively. The hoisting mechanism further comprises an actuating device, and the actuating device synchronously acts on the pivot points 33, 43 of the first strut group 3 and the second strut group 4 to increase the angle a between the first strut 31 and the second strut 32 of the first strut group and the second strut group so that the hoisting beam 2 is lifted.

In some embodiments, the base 1 can comprise a first end 11 and a second end 12, and similarly, the hoisting beam 2 can comprise two ends, i.e. a first end 21 and a second end 22. The first strut group 3 and the second strut group 4 can be connected to the two ends of the hoisting beam 2, and the actuating device is located between the first strut group 3 and the second strut group 4. In such embodiments, the first strut group 3 is sufficiently spaced apart from the second strut group 4, so that they provide more stable support for the hoisting beam 2. In some embodiments, the hoisting beam 2 can be selected as a long beam, e.g. a beam greater than 1 meter, and can be partially across the bottom of the vehicle to provide stable and reliable support for the vehicle.

In some embodiments, as shown in FIG. 4 and FIG. 5, the first strut 31, 41 and the second strut 32, 42 of each of the first strut group 3 and the second strut group 4 together form an inward arrow, the actuating device pushes outward the pivot points 33, 43 of the first strut group 3 and the second strut group 4 so as to lift the hoisting beam 2, wherein FIG. 5 is the case where the hoisting device is further unfolded after the pivot points 33 and 43 are pushed outward, and the included angle a between the first strut 31 and the second strut 32 is further increased. In some embodiments, the included angle a between the first strut 31 and the second strut 32 can be increased to a maximum of about 180 degrees, and at this time, the first strut 31 is in line with the second strut 32, while the hoisting beam 2 is lifted to the highest position. Therefore, the hoisting device according to the embodiments of the invention has a large hoisting stroke, and in addition, if the maximum hoisting height of the hoisting device needs to be further increased, the length of the first strut 31, 41 and the second strut 32, 42 can be increased.

In some embodiments, the base 1 can be provided with a U-shaped groove, and the first strut group 3, the second strut group 4 and the actuating device can be accommodated in the U-shaped groove of the base 1 especially in a contracted state. Thus, the hoisting device has a smaller height in the contracted state, so that this type of conveying device can be applied to a vehicle with a lower chassis, such as a sports car or a racing car, and this type of vehicle is difficult to be conveyed by a common conveying device.

In some embodiments, the actuating device can comprise only a single actuator, the single actuator simultaneously acts on the pivot points of the first strut group and the second strut group, e.g. a lead screw having threaded sections in opposite directions, and the lead screw can be driven by an electric motor and can pass through screw nuts at the pivot points 33, 43 of the first strut group 3 and the second strut group 4. In some embodiments, the actuating device comprises a first actuator 5 and a second actuator 6, and the first actuator 5 and the second actuator 6 synchronously operate and respectively act on the pivot points 33, 43 of the first strut group 3 and the second strut group 4.

In some embodiments, as shown in FIG. 4 and FIG. 5, the first actuator 5 and/or the second actuator 6 can use a telescopic actuator, a first end 55 of the telescopic actuator is pivotally connected to the base 1, and a second end 54 of the telescopic actuator is pivotally connected to the pivot point 33, 43 of the first strut group or the second strut group. In some embodiments, the telescopic actuator comprises an actuator body 53 and a first rod 51 and second rod 52 nested to each other, and the actuator body 53 can drive the first rod 51 to extend or retract relative to the second rod 52, so as to push outward the pivot point 33, 43 of the first strut group 3 and/or the second strut group 4 and to thus lift the hoisting beam 2.

Figure 6:
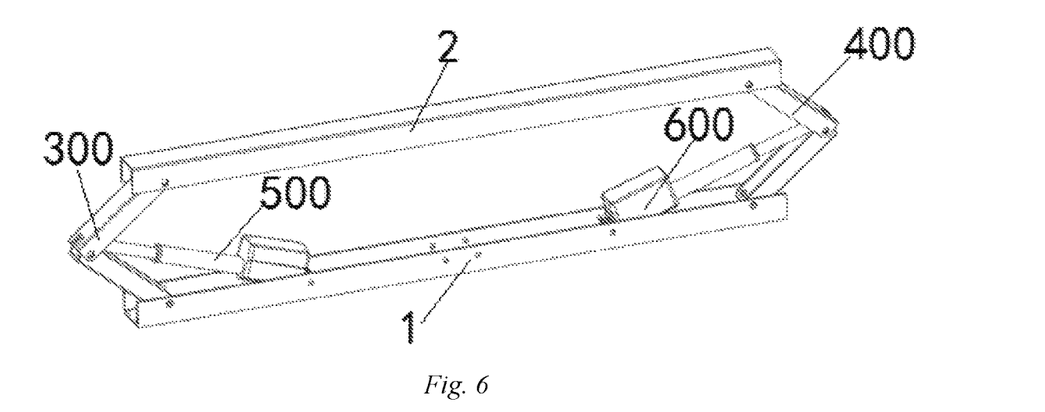
FIG. 6 shows a perspective view of the hoisting device according to a further embodiment.

With continued reference to FIG. 6, it shows a hoisting device according to a further embodiment of the invention. The hoisting device in this embodiment is similar to the hoisting device in the embodiment of FIG. 4 and FIG. 5, and differs in that a first strut and a second strut of each of a first strut group 300 and a second strut group 400 together form an outward arrow, and actuating devices 500, 600 pull inward pivot points of the first strut group 300 and the second strut group 400 so as to lift the hoisting beam 2.

Figure 7:
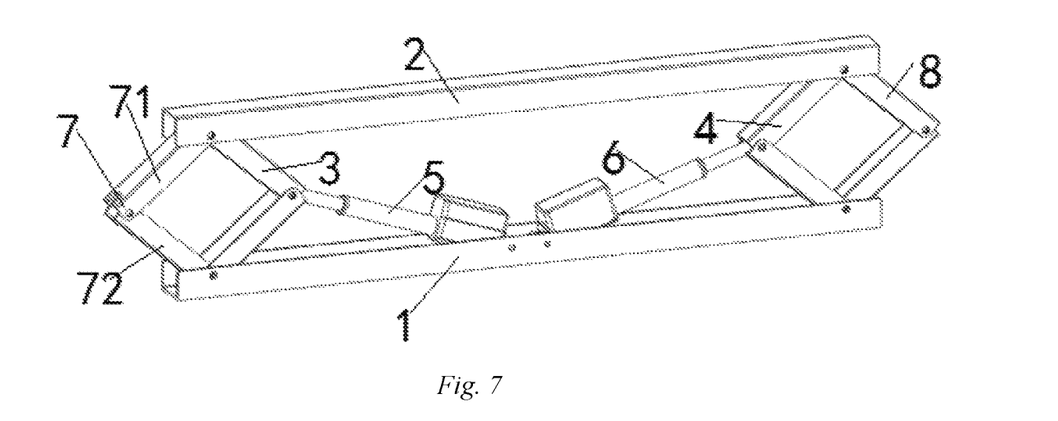
FIG. 7 shows a perspective view of the hoisting device according to a further embodiment.

With continued reference to FIG. 7, it shows a hoisting device according to a further embodiment of the invention. The hoisting device in this embodiment is similar to the hoisting device in the embodiment of FIG. 4 and FIG. 5, and differs in that the hoisting device is additionally provided with an auxiliary strut group 7, 8 between the base 1 and the hoisting beam 2, the auxiliary strut group 7, 8 comprises a third strut 71 and a fourth strut 72, a first end of the third strut 71 is pivotally connected to a first end of the fourth strut 72, and a second end of each of the third strut 71 and the fourth strut 72 is pivotally connected to the hoisting beam 2 and the base 1, respectively. In some embodiments, as shown in FIG. 4, the first strut group 3 and the auxiliary strut group 7 together form a diamond structure, and the second strut group 4 and the auxiliary strut group 8 together form a diamond structure. By providing the auxiliary strut groups 7, 8, the support of the hoisting beam 2 is more stable, and the stability and reliability of the entire hoisting device is improved.

Figure 8:
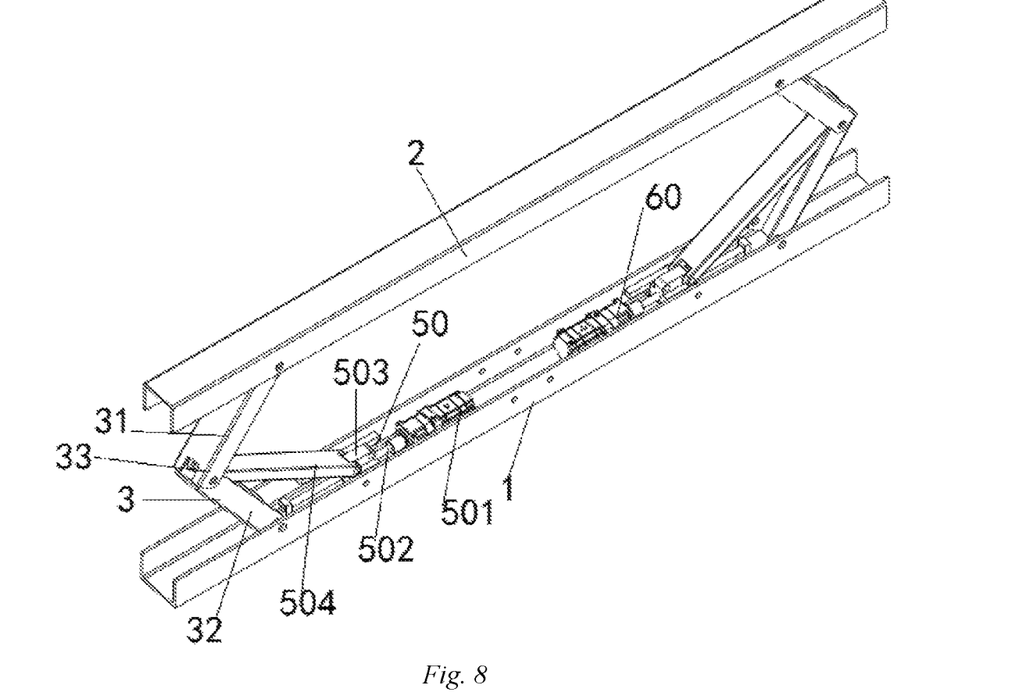
FIG. 8 shows a perspective view of the hoisting device according to a further embodiment.
Figure 9:
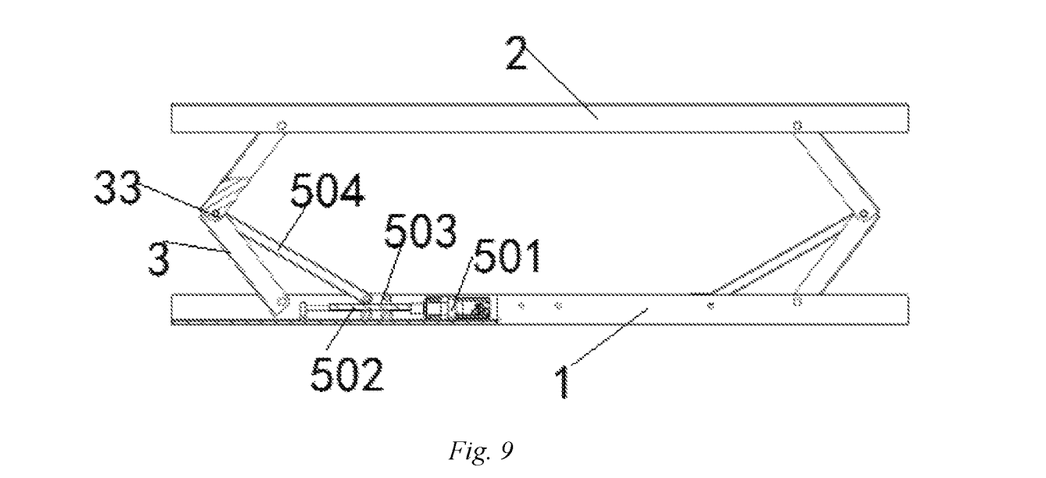
FIG. 9 shows a side view of the hoisting device in FIG. 8, with a part shown in section.

With continued reference to FIG. 8 and FIG. 9, they respectively show a hoisting device according to a further embodiment of the invention. The hoisting device in this embodiment is similar to the hoisting device in the embodiment of FIG. 4 and FIG. 5, and differs in using a further actuating device, which comprises a first actuator 50 and a second actuator 60. In this embodiment, the first actuator 50 and/or the second actuator 60 comprise(s): a lead screw 502, the lead screw 502 being driven to rotate by an electric motor 501 arranged in the base 1; a screw nut 503 matching the lead screw 502, the screw nut 503 being driven by the lead screw to move horizontally; and a push rod 504, a first end of the push rod 504 being pivotally connected to the screw nut 503, and a second end of the push rod 504 being pivotally connected to the pivot point 33, 43 of the first strut group 3 or the second strut group 4. It should be understood that two types of actuators and their arrangements are illustrated in specific embodiments, and in an alternative embodiment, the actuating device can select any other suitable type of actuator.

It should be understood that the embodiments of the invention exemplarily show a plurality of hoisting mechanisms, however, those skilled in the art can select any other suitable type of hoisting mechanism, and such modification shall fall within the scope of the invention.

In a further aspect, the invention further provides a battery swap station, which comprises the hoisting device according to any one of the above embodiments. As shown in FIG. 7, in some embodiments, the battery swap station comprises a battery swap platform 9, the battery swap platform 9 comprises a pair of hoisting devices 91, 92, the pair of hoisting devices 91, 92 are arranged in parallel, corresponding to a position between a front wheel and a rear wheel at the bottom of a vehicle 100, and being able to stably and reliably hoist the vehicle to a desired height by means of the pair of hoisting devices 91, 92.

It should be understood that all of the above preferred embodiments are exemplary rather than limiting, and any modification or variation made by those skilled in the art to the specific embodiments described above without departing from the concept of the invention shall fall within the scope of legal protection of the invention.

What is claimed is:

1. A hoisting device, comprising:
    a base;
    a hoisting beam;
    a first strut group and a second strut group between the base and the hoisting beam, the first strut group and the second strut group respectively comprising a first strut and a second strut, a first end of the first strut and a first end of the second strut being pivotally connected at a pivot point, and a second end of the first strut and a second end of the second strut being respectively pivotally connected to the hoisting beam and the base; and
    an actuating device, the actuating device synchronously providing force at the pivot points of the first strut group and the second strut group to change an angle between the first strut and the second strut of the first strut group and the second strut group so that the hoisting beam is lifted or lowered,
    wherein the base has a U-shaped groove,
    wherein the first strut group, the second strut group and the actuating device are accommodated in the U-shaped groove of the base,
    wherein the actuating device comprises a first actuator for the first strut group and a second actuator for the second strut group,
    wherein the first actuator and the second actuator synchronously operate to provide the force at the pivot points of the first strut group and the second strut group, and
    wherein the first actuator or the second actuator comprises:
        a lead screw driven by an electric motor arranged in the base;
        a screw nut matching the lead screw, the screw nut being driven by the lead screw to move horizontally; and
        a push rod, a first end of the push rod being pivotally connected to the screw nut, and a second end of the push rod being pivotally connected at the pivot point of the first strut group or the second strut group.

2. The hoisting device according to claim 1, wherein the first strut group and the second strut group are connected to two ends of the hoisting beam, and wherein the actuating device is located between the first strut group and the second strut group.

3. The hoisting device according to claim 2, wherein the first strut and the second strut of the first strut group and the first strut and the second strut of the second strut group each form an outward arrow, and wherein the force provided by the actuating device inwardly pulls on the pivot points of the first strut group and the second strut group so as to lift the hoisting beam.

4. The hoisting device according to claim 2, wherein the first strut and the second strut of the first strut group and the first strut and the second strut of the second strut group each form an inward arrow, and wherein the force provided by the actuating device outwardly pushes on the pivot points of the first strut group and the second strut group so as to lift the hoisting beam.

* * * * *